(12) United States Patent
Suzuki

(10) Patent No.: US 6,816,268 B1
(45) Date of Patent: Nov. 9, 2004

(54) PRINTED MATTER OF TEXT DATA AND METHOD AND APPARATUS FOR PRINTING THE SAME

(75) Inventor: Kazuhiko Suzuki, Ota-ku (JP)

(73) Assignee: Creative Brains, K.K., Tokyo (JP)

(*) Notice: Subject to any disclaimer, the term of this patent is extended or adjusted under 35 U.S.C. 154(b) by 876 days.

(21) Appl. No.: 09/641,822

(22) Filed: Aug. 21, 2000

(30) Foreign Application Priority Data

Aug. 24, 1999 (JP) .......................................... 11-237633

(51) Int. Cl.⁷ .............................................. G06F 15/00
(52) U.S. Cl. ...................... 358/1.11; 358/1.11; 358/1.9; 715/518; 715/519
(58) Field of Search ................................ 715/518, 519; 358/1.11, 1.09, 1.7, 1.13, 1.9, 509, 516

(56) References Cited

U.S. PATENT DOCUMENTS 5,740,456 A * 4/1998 Harel et al. .................. 715/518
5,802,532 A * 9/1998 Nakayama et al. .......... 715/519
6,452,597 B1 * 9/2002 Goldberg et al. ............ 345/472
6,587,225 B1 * 7/2003 Sakatani et al. ............. 358/1.9
6,633,292 B2 * 10/2003 Nakatsuji et al. ........... 345/467

* cited by examiner

*Primary Examiner*—Mark Wallerson
*Assistant Examiner*—Saeid Ebrahimi
(74) *Attorney, Agent, or Firm*—Oliff & Berridge, PLC

(57) ABSTRACT

A printed matter comprising: a multiplicity of character strings such as words or sentences being printed on a single printing plane according to a ranking of the character strings determined based on a predetermined rule; the character strings being printed at respective font sizes which vary gradually in order of the ranking of the character strings; and at least two of the character strings being superposed on each other in which one of the two character strings whose font size is smaller than that of the other character string is provided with a fringe at a superposed portion thereof. A method and an apparatus for printing the printed matter are also disclosed.

17 Claims, 7 Drawing Sheets

FIG.4

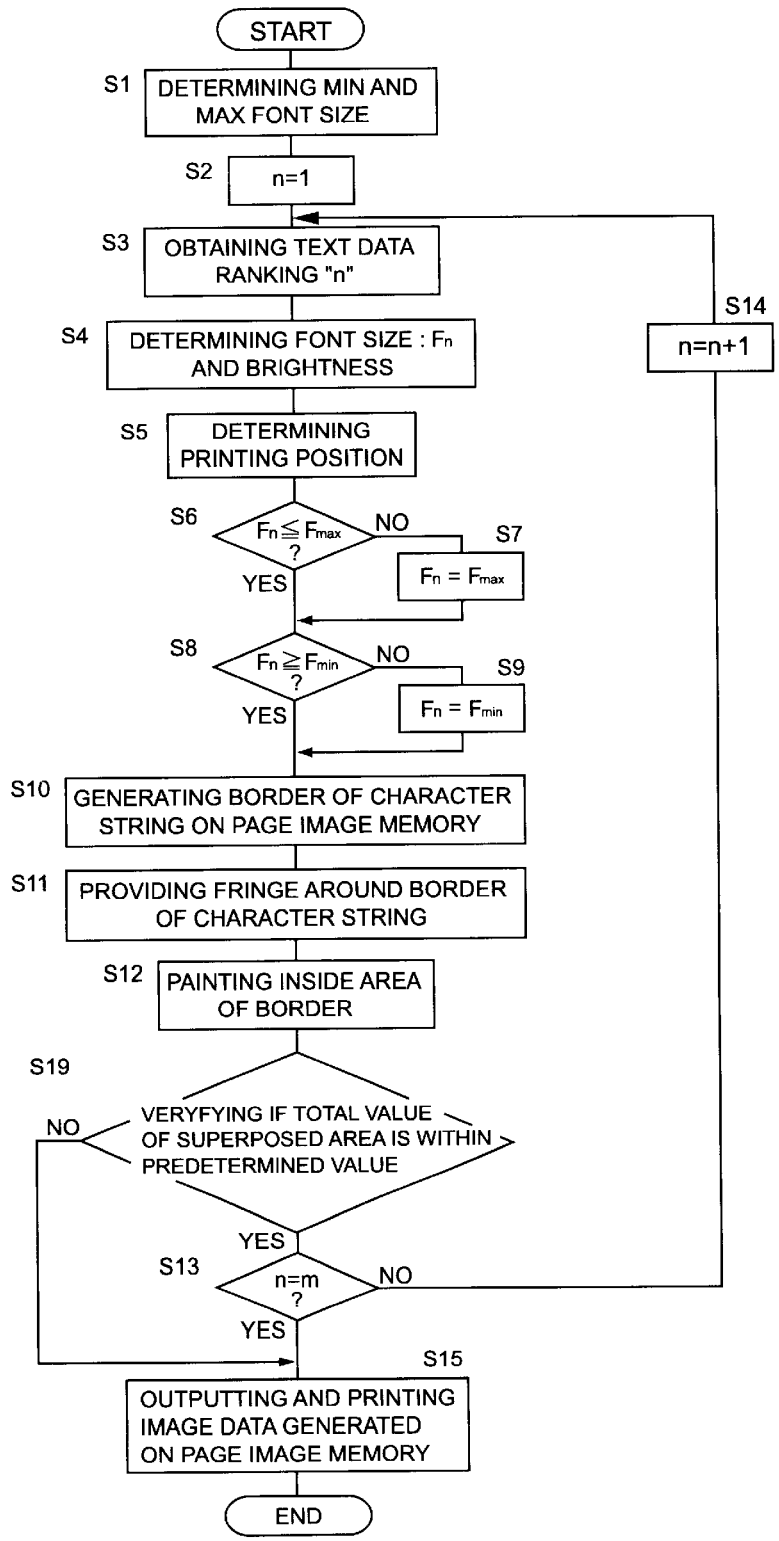

PRINTED MATTER OF TEXT DATA AND METHOD AND APPARATUS FOR PRINTING THE SAME

This application is based on Japanese Patent Application No. 11-237633 filed on Aug. 24, 1999, the contents of which are hereby incorporated by reference.

BACKGROUND OF THE INVENTION

1. Field of the Invention

The present invention relates generally to techniques for printing and displaying a multiplicity of character strings on one printing plane such as a sheet of paper. More particularly, the present invention is concerned with a printed matter which is novel in printing form and which is capable of presenting desired character strings selected from the multiplicity of character strings, owing to a change of a distance between an observer and the printed matter, as well as a change of a view point of the observer on the printing plane.

The present invention is also concerned with a method and an apparatus for effectively printing such a printed matter.

2. Description of the Related Art

As one type of information providing media, there has been widely used printed matters in which character strings, such as words and sentences, are fixedly printed on printing planes made of paper or a resin material for presenting specific meanings or contents of the information, owing to their excellent utility, and their advantages in storage and handling. Most of these conventional printed matters as represented by books, are constructed on a premise that the observer obtains from the printed matter a desired character strings by reading through the printed matter from the top thereof in the order of the description, or alternatively, by manually selecting and limiting the information provided by the printed matter. That is, the conventional printed matter are arranged on the basis of a so-called "sequential access method", so that the observer is required to change or move his or her own view point on the printing plane along the lines of character strings so as to select or obtain the desired character strings.

Recent remarkable development of computer technology makes it possible to provide such information consisting of the multiplicity of character strings by means of a computer system. For instance, a computer graphics technology may be utilized for displaying three-dimensional image on a display of a display device such as a CRT Display device. This makes it possible to map the multiplicity of character strings on respective positions of a three dimensional coordinate as a virtual space, and displaying the virtual space on the display of the display devise, so that the observer can recognize the virtual space, as if his or her view point moves on the three dimensional space. Therefore, the computer graphics is capable of selectively showing the multiplicity of character strings on one display.

However, the conventional printed matter as described above is adapted to provide a stable display, and is incapable of providing a dynamic display like in the computer graphics technology as described above. The conventional printed matter once printed does not change dynamically, thereby suffering from a problem of difficulty in providing the dynamic display. This drawback of the conventional printed matter results in that the conventional printed matter is limited in display formats in comparison with the display provided by utilizing the computer graphics techniques, although the conventional printed matter is advantageous in terms of utility, storage and handling.

For the above reasons, it is impossible to provide a printed matter which is printed on a single printing plane and is capable of drawing an observer's attention initially to the character strings of higher ranking, e.g., the character strings having higher degrees of importance, and then to the character strings of lower ranking, e.g., the character strings having lower degrees of importance, such that the character strings are recognized gradually by the observer from the ones having the higher degrees of importance to the ones having the lower degrees of importance.

SUMMARY OF THE INVENTION

It is therefore a first object of the present invention to provide a printed matter having a novel form wherein a multiplicity of character strings are printed in a single printing plane, and which permits an observer to selectively obtain or recognize desired character strings, on the basis of a predetermined ranking of the character stings, e.g., a ranking of degrees of importance of the character strings.

It is a second and a third object of the present invention to provide a printing method and a printing apparatus arranged for providing such a printed matter of the present invention.

It is a fourth object of the present invention to provide computer readable media for supplying a computer program to a computer system so that the computer system executes the printing method of the present invention.

The above first, second, third and fourth objects may be achieved according to the following modes (1)–(2), (3)–(9), (10) and (11)–(12) of the invention, respectively, each of which is numbered like the appended claims and depends from the other mode or modes, where appropriate, to indicate possible combinations of elements or technical features of the invention. However, it is to be understood that the present invention is not limited to those modes of the invention and combinations of the technical features, but may be otherwise recognized based on the thought of the present invention that disclosed in the whole specification and drawings or that may be recognized by those skilled in the art in the light of the disclosure in the whole specification and drawings.

(1) A printed matter comprising: a multiplicity of character strings such as words or sentences being printed on a single printing plane according to a ranking of said character strings determined based on a predetermined rule; the character strings being printed at respective font sizes which vary gradually in order of the ranking of the character strings; and at least two of the character strings being superposed on each other in which one of the two character strings whose font size is smaller than that of the other character string is provided with a fringe at a superposed portion thereof.

In the printed matter of the present invention, the multiplicity of character strings are printed at respective font sizes which vary gradually in order of the ranking of the character strings. If the observer observe the printed matter from a distance (hereinafter referred to as a "distant observation"), character strings printed at the smaller font sizes are likely to be illegible, so that the observer can observe substantially only character strings printed at the larger font sizes. On the other hand, the observer can observe such illegible character strings in the order from the larger font sized character string to the smaller font sized character strings, as the observer comes closer to the printed matter, or brings the printed matter close to his or her eyes (hereinafter referred to as a "nearsighted observation"). Once the observer is conscious or aware of the character strings having smaller font sizes, his or her degree of consciousness of the character strings having larger font sizes is accordingly reduced, leading to that the larger font sized character strings become illegible.

In particular, the present printed matter includes the plurality of character strings which are printed while being mutually superposed. In this case, the distant observation of the printed matter by the observer permits that the observer recognizes only the character strings printed at the larger font sizes, since the character strings printed at the smaller font sizes are superposed on the character strings printed at the larger font sizes and are seen as a part of the character strings printed at the larger font sizes. In addition, the character strings printed at smaller font size are provided with a fringe. In the distant observation, the fringes provided in the character strings having smaller font sizes also becomes illegible, permitting the observer observes only the character strings having larger font sizes. The fringes also facilitates the observer to recognize the character strings having smaller font sizes, when the observer observes the printed matter while coming closer to the printed matter close to his or her eyes. That is, the fringe is effective to give the character strings having smaller font sizes a priority to be recognized by the observer, in the nearsighted observation, so that the observer's recognition of the character strings having larger font sizes is accordingly reduced.

Therefore, the present printed matter is capable of providing the observer different information by utilizing different group of character strings, by only changing the distance between the observer and the printed matter, although the present printed matter is stationary. The present printed matter is also capable of functioning similarly as the three-dimensional display medium.

In the presence of the fringes provided to the respective character strings having smaller font sizes in the plurality of character strings mutually superposed, it is effectively prevented undesirable vanishment of boundaries of the smaller font sized character strings, due to superposition of the plurality of character strings, making it possible to print the multiplicity of character strings in the single printing plane, while obtaining an excellent legibility of each of the character strings.

The character strings used in the printed matter of the present invention are not particularly limited provided the character strings contain respective information to be provided. For instance, the character strings may be words or sentences such as names and phrases consisting of a single or a plurality of characters. Further, the character strings includes, but not limited to, phonograms such as Roman characters, Sanskrit characters, Arabic characters, and the Japanese syllabary, and ideographs such as pictorial symbols, hieroglyphs, and Chinese characters.

(2) A printed matter according to the above mode (1), wherein the multiplicity of character strings being printed so as to be spread out over the printing plane, the printing plane having domains each representing conceptual similarity of character strings located therein, and the font sizes of the character strings representing degrees of importance thereof.

The printed matter according to the above-indicated mode (2) permits the observer in his or her distant observation to survey the entire of the information printed on the printing plane, and permits the observer to approach a desired domain to observe details of the character strings of the domain, such that the observer chooses character strings whose meaning become gradually detailed, as the observer comes closer to the printed matter, or brings the printed matter close to his or her eyes. In a general observation manner, observer may observe an observing object by using his or her visual sense such that the observer obtains details of the object, as he or she comes closer to the object. The present printed matter allows the observer to observe it according to this general observation manner, resulting in an improved utility of the printed matter.

In the above mode (2), the font sizes used for printing the respective character strings may preferably determined such that the number of legible character strings become larger, as the observer comes closer to the printed matter. For instance, the font sizes of the character strings may be changed continuously according to the ranking of the character strings on the basis of their degrees of importance. Alternatively, the font sizes of the character strings may be gradually changed at a constant proportion every character string, or every several number of character strings. It is preferable that the all character strings essentially have the same font face. However, the all character strings may differ in their font faces such that the font faces of the character strings vary depending upon their ranking or concepts. It is also possible that the font face may vary in a single character string.

Moreover, the multiplicity of the character strings may be suitably ranked depending upon a predetermined constant standard, which is not particularly limited. In this arrangement, the same set of character strings may be printed different manner, by only ranking differently the character strings based on different importance-basis measures. In addition, properties of the fringe provided to the character string(s) which is superposed on the other character string(s), is not particularly limited, provided the color of the fringe is visually distinguished from the printed body of the character strings. It is preferable that the fringe has not only a color similar to the ground color of the printing plane, but also a width which is smaller than the printed body of the corresponding character string so that the legibility of the character strings is not limited by the presence of the fringe. The importance of the respective character strings may be the importance of the information of the respective character strings, which are recognized as values of frequencies in statistics, or grades in concept.

The range of variation in their font sizes of the character strings may preferably be made as large as possible, so that the range of variation of the distance between the observer and the printed matter can be made larger, resulting in an increased depth of legible information. In this respect, a possible range of variation in font sizes of the character strings may preferably be determined taken into account the size of the employed printing plane, the possible range of variation in distance between the observer and the printing plane, or the like.

(3) A method of printing a multiplicity of character strings on one printing plane, based on a multiplicity of text data each being tagged with at least printing positional information and rank-able information, the method comprising the steps of: determining a font size of each of the character strings such that the font sizes of the character strings vary gradually in order of ranking of the character strings determined based on the rank-able information tagged to the text data; arranging the character strings at respective positions of the printing plane based on the printing positional information tagged to respective text data; and if at least two of the character strings are superposed on each other, then providing a fringe around a superposed portion of one of the two character strings whose font size is smaller than that of the other character string.

In the method of the present invention according to the third mode (3) of the invention described above, the printed matter according to the above mode (1) or (2) of the present invention may be advantageously formed or printed. That is, the present method permits a formation of a novel printed matter which is capable of reproducing legibly a computer graphical images such as a three dimensional coordinate as a virtual space wherein the multiplicity of character strings are respectively mapped, so that the formed printed matter functions like as a three dimensional display by only changing the distance between the observer and the printing plane of the printed matter.

In the printing method according to the above mode (3) of the invention, the printing positional information is not particularly limited, provided each information is capable of specifying a position in the printing plane on which the corresponding character strings may be printed. The printing positional information may be provided in the form of coordinate values such as coordinate values in an X-Y coordinate, for example. The rank-able information may be information which can be ranked according to a constant standard, which may be provided in the form of frequencies in a statistic data, values of sequence, or the like. It is noted that each of the text data represents multi-dimensionally the corresponding character strings such that the text data includes the printing positional information, the rank-able information, and the font size information, as well as character information. In this respect, the text data is considered as a character data which is capable of specifying a printing mode of the corresponding character strings on the printing plane.

In the present method, the "printing" represents printing of the character strings in a visible form on the printing plane, and is not particularly limited to specific printing techniques. The font sizes of the all character strings and the form of the fringes provided to desired character strings are suitably arranged, as described above with respect to the printed matter of the present invention. The multiplicity of character strings may be directly printed on the final printing plane, or alternatively be formed initially on a printing plate (an artwork) or an original form, and then printed on the printing plane such as a sheet of paper.

(4) A method of printing according to the above mode (3), wherein the rank-able information includes a degree of importance of each of the text data, so that the text data being ranked based on the degrees of importance thereof, and the font size of the character strings vary gradually in order of the ranking of the text data such that the font sizes are made larger as the degrees of importance are increased.

The printing method of the present invention according to the above mode (4), facilitates printing the aforementioned printed matter of the present invention, which printed matter allows the observer in the distant observation to visually recognize only the character strings whose font size, i.e., importance is larger so as to survey the entire of the printed information, and which printed matter is capable of providing efficiently the observer with many information by using the other character strings, such that the observer gradually recognizes the character strings in which the degrees of importance are gradually decreased, as the observer comes closer to the printed matter. In this respect, the importance of respective character strings may be evaluated values obtained by evaluating the all character strings on the basis of a specific evaluation standard, but not particularly be limited. When the rank-able information comprises statistical data, frequency values of the statistical data may possibly be employed as the degrees of the importance, for example.

(5) A method of printing according to the above modes (3) or (4), the method further comprising the step of: determining a degree of brightness of each of the character strings based on the rank-able information tagged to the text data, such that the degrees of brightness of the character strings are made lager as the font sizes of the character strings are made larger.

The printing method according to the above mode (5) is effective to increase a legibility of the character strings having smaller font size. In this respect, the brightness is a synonym of luminescence of a printed character and may be defined as a ratio of an amount of light reflected on each color to an amount of light reflected on white color. For ensuring this effect of the above mode (5), it is desirable that the ground color of the printing plane is white color or higher brightness colors like as white color.

The printing method according to any one of the above modes (3)–(5) of the present invention may be arranged such that the text data further includes data of hue and/or saturation, in addition to the data of brightness, so that the character strings differ from each other in their hues and/or saturation. For instance, the character strings may be gradually changed in their hues and/or saturation in a suitable order determined according to another evaluation standard which is different from the standard used for determined the font sizes of the character strings, making it possible to provide a printed matter which illegibly shows higher dimensional information.

The printing method according to any one of the above modes (3) or (4) of the present invention may be arranged, as needed, such that the brightness of the printed character strings based on the respective text data gradually change based on the rank-able information so that the brightness of the character strings are larger as the font sizes of the character strings are smaller. This arrangement permits that the character strings having larger font sizes are displayed or printed more conspicuous than the character strings having smaller font sizes.

(6) A method of printing according to any one of the above modes (3)–(5), further comprising the step of: if a plurality of the character strings based on a plurality of the text data are located in an identical range, then adjusting the printing positions of the plurality of character strings such that the printing positions are offset relative to each other. This arrangement is effective to prevent the character strings mutually superposed are made illegible due to an increase of an area in which the character strings are superposed on each other, leading to an increased utility of the printed matter printed according to the present invention.

It may be considered that printing positions of a plurality of character strings are located in the identical range, not only when the printing positions are coincide with each other, but also when the printing positions are adjacent to each other so that the printed character strings are made illegible. The printing positions of the character strings which are mutually superposed may be offset from each other such that one of the mutually superposed character strings is determined as an original position, while the other character strings are displaced relative to the original position, or alternatively, be offset from each other such that the all printing positions of the character strings are repositioned. Since a significantly larger amount of displacement of the character strings may lead to undesirable changes in meanings provided by the printed matter, it is desirable to limit the amount of displacement of the character strings as small as possible. It is possible to displace the mutually superposed character strings relative to each other so that the character strings do not have superposition. Preferably, the mutually superposed character strings are displaced relative to each other in a vertical or upper-and-lower direction of the printing plane so that the printed character strings are not superposed on each other at their about one-third, more preferably, one-third through two-thirds areas. The excessive amount of displacement of the mutually superposed character strings may possibly deteriorate accuracy of displayed information. Therefore, a possible amount of relative displacement of the mutually superposed character strings is suitably determined or restricted, taken into account required characteristics of the printed matter. It is desirable that the amount of displacement of the superposed character strings is suitably restricted by adjusting a ratio of an amount of relative displacement of the mutually superposed character strings to a dimension of a printed plane, or alternatively by adjusting a ratio of an amount of relative displacement of an amount of relative displacement of the mutually superposed character strings to a dimension of each character string, for example.

(7) A method of printing according to any one of the above modes (3)–(6), wherein a maximum value of the font sizes of the character strings is determined based on at least a size of a printing area of the printing plane.

In the printing method according to the above mode (7), the font sizes of the character strings can be set at the practical range considered from the size of the printing plane. Therefore, the multiplicity of the character strings can be effectively printed on the printing plane having the predetermined range. Described more specifically, the maximum font size is set to 50–150 point, more preferably, 80–120 point, when a printing plane having a B0 size is employed. For a printing plane having an A4 size, the maximum font size is set to 10–50 point, more specifically 20–30 point. With the maximum font size determined as described above, one or more of the character strings may have the font size which is larger than the predetermined maximum font size. In this case, the character string(s) having a font size larger than the predetermined maximum font size may be printed by using the same predetermined font size. Preferably, the font sizes of the all character strings may be determined such that the character strings have respective font sizes which are gradually decreased from the maximum value, in order of raking of the character strings.

(8) A method of printing according to any one of the above modes (3)–(6), wherein a minimum value of the font sizes of character strings is determined based on at least a visual recognizing ability of an observer.

In the above mode (8), the minimum value of the font size is suitably limited so that the character strings having the minimum font size are legible in the nearsighted observation. This arrangement permits an effective printing of only the character strings which is practically useful, while avoiding printing of illegible and excess character strings. Described more specifically, the legibility of the character strings varies depending upon a variation of visually recognizing abilities of the observer and a distance between the observer and the printing plane. In general, the minimum font size is preferably set to at around 3 point, more preferably to 4–5 point, in the light of a visual acuity of a healthy subject.

With the minimum font size determined as described above, one or more of the character strings may have the font size which is smaller than the predetermined minimum font size. In this case, character string(s) having a font size smaller than the predetermined minimum font size may be printed by using the same predetermined font size. Preferably, the font sizes of the all character strings may be determined such that the character strings have respective font sizes which are gradually increased from the minimum value, in order of ranking of the character strings.

Preferably, a combination of the methods according to the above modes (7) and (8) may be employed, in which the character strings have respective font sizes which vary within a range between the maximum and minimum font sizes predetermined according to the respective methods. More preferably, the character strings are arranged to be printed with respective font sizes which differ from one another and which vary in order of ranking within the range between the maximum and minimum font sizes.

(9) A method of printing according to any one of the above modes (3)–(8), wherein the step of arranging the character strings at respective positions of the printing plane is executed in the order of ranking of the character strings determined based on the rank-able information, the method further comprising the step of: if a ratio of an area where the character strings are mutually superposed to an entire area of the printing plane exceeds a predetermined value, then prohibiting printing of the character strings which are ranked lower than the currently arranged character strings.

The printing method according to the above mode (9) is capable of controlling the number of character strings to be printed so as to prevent or avoid undesirably increase of the number of the printed character strings which leads to illegibility of the printed character strings. This arrangement permits both of a sufficient utility of the printed matter and an improved display wherein as many as possible information are provided by the multiplicity of character strings. It is desirable that the printing method of the above mode (9) is modified to further includes a sub-steps of executing some indication so as to indicate the character strings which are not printed.

(10) A printing apparatus for printing a multiplicity of character strings on one printing plane, based on a multiplicity of text data each being tagged with at least printing positional information and rank-able information, the apparatus comprising: a printing position determining means for determining a printing position of each of the character strings based on the printing positional information tagged to the corresponding text data; a ranking determining means for determining a ranking of the text data based on the rankable information tagged to the respective text data; a font size determining means for determining a font size of each of the character strings such that the font sizes are arranged so as to increase or decrease gradually in order of the ranking of the text data; a fringe information assigning means for assigning a fringe information, if at least two of said character strings are superposed on each other, to the text data of one of the character strings whose font size is smaller than that of the other character strings, so that the character string having smaller font size are provided with a fringe around a superposed portion thereof; a printing device for printing on the printing plane the character strings corresponding to the plurality of text data, such that the character strings are printed on respective printing positions determined based on the printing positional information, with respective font sizes determined by the font size determining means, while being provided with the fringe based on the fringe information assigned by the fringe information assigning means.

The printing apparatus according to the above mode (10) of the present invention is capable of forming the printed matter of the present invention, and is also capable of executing the method of printing of the present invention as described above. It should be understood that any one of the above-described modes described with respect to the printed matter and printed method of the present invention are similarly applicable to the printing apparatus of the present invention. The printing device of the printing apparatus of the present invention may be a device which is adapted to directly print a printing image on the printing plane, or alternatively may be a device wherein the desired printing image is initially formed in an art work or original form and is then transferred onto a desired printing plane.

(11) A computer program product for printing a multiplicity of character strings on one printing plane based on a multiplicity of text data each being tagged with at least printing positional information and rank-able information, the computer program comprising: computer code that determine a font size of each of the character strings based on the rank-able information tagged to the corresponding text data, such that the font sizes are changed gradually in order of ranking of the character strings determined based on the rank-able information tagged to the text data; computer code that arranges the character strings at respective positions on the printing plane based on the printing positional information tagged to respective text data; computer code that if at least two of the character strings are superposed on each other, then providing a fringe around a superposed portion of one of the two character strings whose font size is smaller than that of the other character strings; and a computer-readable medium that stores the program codes.

The computer program product of the present invention may preferably comprise computer code that performs any one or more of other steps according to the above modes (4)–(9). It is appreciated that the computer-readable medium may preferably be selected from a floppy disk, a magnetic tape, an optical disk, a magnet-optical disk, a computer hard disk, a flash memory and the like.

(12) A computer program data signal for printing a multiplicity of character strings on one printing plane based on a multiplicity of text data each being tagged with at least printing positional information and rank-able information, the computer program data signal embodied in a telecommunication medium and representing sequences of instructions which, when executed by a processor caused by the processor to perform the steps according to the above modes (3).

The computer program data signal according to the above mode (12) may further represent sequences of instructions to perform the steps according to one or more of the above modes (4)–(9).

The computer program data signal embodied in the telecommunication medium of the present invention makes it possible to easily provide a printing apparatus according to the present invention in association with a computer system, by only transmitting the computer program data into the computer system via the telecommunication channel. It is appreciated that the telecommunication medium may preferably be selected from any one of various kinds of medium which is capable of transmitting the computer program data signal. For instance, an optical cable, a radio, a cable, or the like which are available in the form of network may be employed. Further, the telecommunication channel may include both of the medium which utilizes a carrier wave for transmitting the computer program data signal and the medium which utilizes no carrier wave for transmitting the computer program data signal.

The computer program stored in the computer readable medium according to the above mode (11), and the computer program data signal according to the above mode (12), permits that the printing method of the present invention is executed by utilizing a computer system, and also permits that the printing apparatus according to the present invention is easily embodied by utilizing a computer system.

BRIEF DESCRIPTION OF THE DRAWINGS

The above and optional objects, features and advantages of the present invention will be better understood by reading the following detailed description of the preferred embodiments of the invention when considered in conjunction with the accompanying drawings, in which:

FIG. 4 is a view of a printed matter output from a conventional printing apparatus as a comparative example;

FIG. 7 is a still another example of a flow chart representing a control program according to which the printed apparatus of FIG. 1 is controlled.

DETAILED DESCRIPTION OF THE PREFERRED EMBODIMENT

Figure 1:
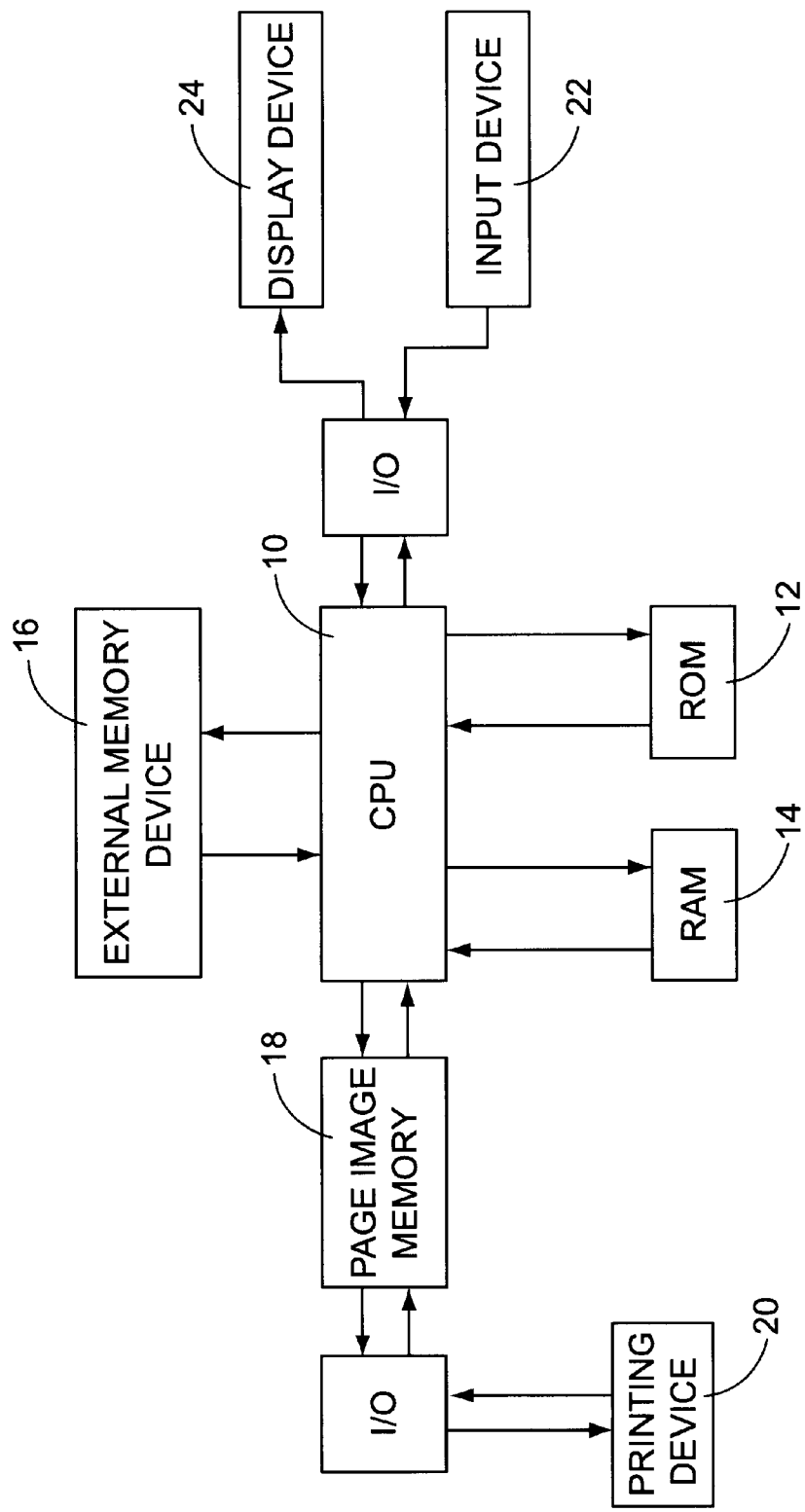
FIG. 1 is a diagrammatic view of a printing apparatus constructed according to one preferred embodiment of the present invention.

Referring first to FIG. 1, there is schematically shown a general structure of a printing apparatus constructed according to a first embodiment of the present invention. The printing apparatus includes a typical, general-purpose computer system, i.e., a CPU 10 as a central processing unit, a ROM 12 in the form of a read-only memory, a RAM 14 in the form of a random-access memory, and an external memory device 16 for storing a set of text data. The printing apparatus further includes a page image memory 18 and a printing device 20. The CPU 10 is adapted to process a set of text data stored in the external memory device 16, according to control programs stored in the ROM 12, while utilizing temporary memory function of the RAM 14, so as to output signals to the page image memory 18 for generating a desired printing image on the page image memory 18. The desired printing image generated on the image memory 18 is printed or reproduced on a sheet of paper as a printing plane by means of the printing device 20. The printing apparatus further includes an input device 22 such as keyboards and mice, and a display device 24 such as a CRT display device. The input device 22 is connected to the CPU 10 via an input and output (I/O) port in order to input command signals, e.g., a start signal and a stop signal, to the CPU 10, while the display device 24 is also connected to the CPU 10 via the I/O port in order to display a status in the procedure in processing the data by the CPU 10. The external memory device 16 may be a floppy disk, a hard disk, an optical disk, a magnet-optical disk, magnetic and paper tape recorders, or the like. The text data stored in the external memory device 16 may be stored in the RAM 14 so that the CPU 10 access to the RAM 14 in order to process the text data stored in the RAM 14. The set of text data stored in and available from the external memory device 16 may consist of a multiplicity of text data each having a multi-dimensional information. That is, each text data includes not only character codes but also positional data codes and ranking data codes, which codes represent its position in the printing plane and its rank in a scale of importance. It is noted that the text data represent respective desired character strings to be printed.

The CPU 10 of the printing apparatus of the present embodiment is operated according to the control program pre-stored in the ROM 12 so that the printing apparatus executes a printing method of the present invention. There will be described in detail, by reference to the flow chart of FIG. 2, a series of process routines executed by the printing apparatus of the present embodiment for performing the printing method of the invention.

Figure 2:
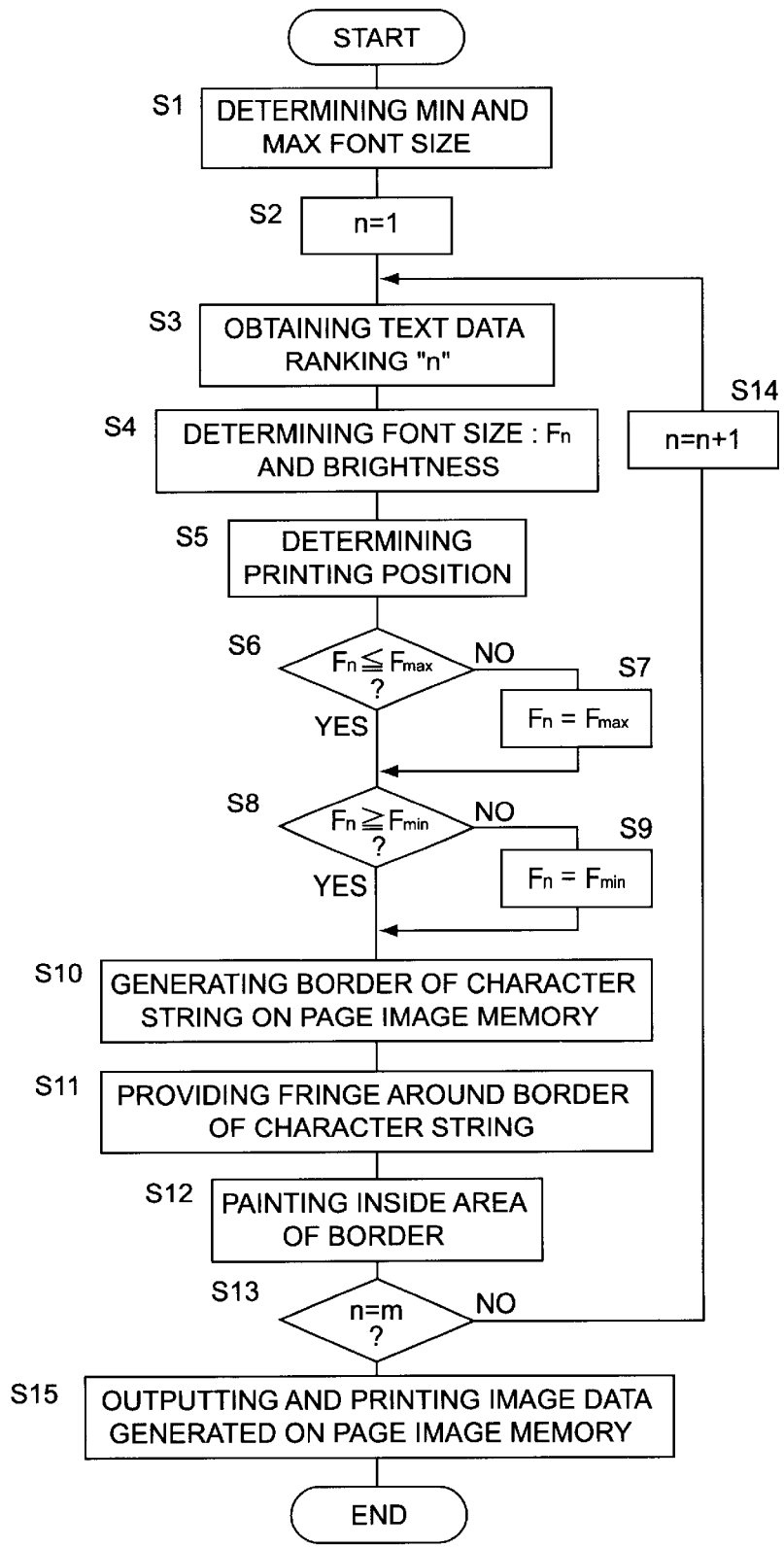
FIG. 2 is one example of a flow chart representing a control program according to which the printing apparatus of FIG. 1 is controlled.

The process routine of FIG. 2 is started with all data initialized. First, at Step S1, the CPU 10 is operated to determine a minimum and a maximum font size of characters to be printed on the printing plane, taken into account given information such as an observer's visual acuity, a size of the printing plane, an available range of a distance between the observer and the printing plane, or the like. Step S1 is followed by Step S2 wherein a counter number (n) variable is initialized, e.g., initialized to one. Subsequently, at Step S3, the CPU 10 is operated to obtain a text data highest in ranking with respect to its degrees of importance, selecting from amount the multiplicity of text data. The process flow goes to Step S4 to determine a font size (F1) of and a brightness of a character string corresponding to the selected text data. It is appreciated that the font size (F1) used for displaying the character string having the highest degree of importance is determined so as to correspond to, for example, so as to be proportional to the degree of the importance ranking tagged to the selected text data, taken into account the size of the printing plane (an area of a printing region) and the total number of the text data. Likewise, the brightness of the character string having the highest degree of importance is determined so as to correspond to, for example, so as to be proportional to the degree of the degree of importance ranking tagged to the selected text data, taken into account the total number of the text data.

The process flow goes to Step S5 in which the CPU 10 determines a printing position of the character string having the highest degree of importance on the printing plane, based on the positional data tagged to the selected text data. For instance, the printing position is obtained as values in an x-axis and an y-axis of a two dimensional coordinate as the printing plane.

The process flow goes next to Step S6 in which verification is made regarding whether the font size (F1) obtained in Step S4 is not larger than an available maximum font size (F-max). If a positive judgement is made at Step S6, namely, if the value of the font size (F1) satisfy the following inequality: F1<F-max, the font size (F1) obtained in Step S4 is employed. If a negative judgement is made at Step S6, namely, if the value of the font size (F1) satisfy the following inequality: F1>F-max, the process flow goes to Step S7 to correct the value of the font size (F1) to satisfy the following equality: F1=F-max. It is appreciated that the value of the available maximum font size (F1) is suitably determined, taken into account the size of the printing plane and the total number of the text data, so as to provide a sufficient utility of a resultant printed matter and a sufficiently high degree of discrimination or conspicuousness of the character strings in the printed matter. The predetermined maximum font size (F-max) may be previously inputted into the control program stored in the RAM 14, via the external input device 22. Alternatively, the maximum font size may be automatically calculated according to a predetermined calculation program and set to the control program.

In the following Step S8, on the other hand, a verification is made regarding whether the font size (F1) obtained in Step S4 is not smaller than an available minimum font size (F-min). When it is determined that the value of the font size (F1) satisfy the following inequality: F1>F-min, the font size (F1) obtained in Step S4 is employed. When it is determined that the value of the font size (F1) satisfy the following inequality: F1<F-min, the process flow goes to Step S9 to correct the value of the font size (F1) to satisfy the following equality: F1=F-min. The available minimum font size (F-min) is suitably determined, taken into account the amount of distance between the observer and the printing plane upon observing the printed matter, and a required visibility of the character string to be recognized by the observer, so as to provide a sufficient utility of the resultant printed matter and a sufficiently high degree of visibility or conspicuousness of the character strings in the printed matter. Like the maximum font size (F-max), the predetermined minimum font size (F-min) may be previously inputted into the control program stored in the RAM 14, via the external input device 22. Alternatively, the minimum font size may be automatically calculated according to a predetermined calculation program and set to the control program.

The character string is printed on a sheet of paper as the printing plane, in a predetermined printing form, i.e., the predetermined font size (F1) and the brightness which are predetermined based on the ranking data tagged to the corresponding text data, and in a desired printing portion which is predetermined based on the positional data tagged to the corresponding text data. Upon printing the character string, a desired printing image is generated on the page image memory 18. Described in detail, the process flow goes to Step S10 in which the CPU 10 determines a start point of a path of the character string. Starting from the start point, the border of the character string is drawn on the corresponding position of the page image memory 18, so that the border of the character strings is generated on the page image memory 18 such that the printing position obtained in Step S5 is placed in the center of gravity of the character string (the center of character strings in the printing plane). Step S10 is followed by Step S11 in which the border of the character string is provided with a fringe which extends around the border of the character string with a constant width and with a color different from a color for printing a body of the character string in terms of color and brightness. It is preferable that the fringe has a color similar to the ground color of the printing plane, e.g., white in general, the color is constant irrespective of the degrees of importance of the respective character strings. In particular, all character strings are fringed with the same form of the fringe as described above, irrespective of the degrees of importance of the respective character strings, according to the present embodiment. The color of the fringe is made similar to the ground color of the printing plane, leading to a resultant printed matter wherein there is visible only the fringes formed around one or more of the mutually superposed character strings which have smaller font sizes. The Step S11 is followed by Step S12 in which the border of the character string is redrawn on the same position, as needed, and the inside area of the border of the character string is painted out with a predetermined color. The color for painting the inside area of the border is not particularly limited. If the text data corresponding to the character string includes a color data tagged thereto, the painting color may be determined based on the color data. It is possible that the all character strings may be painted with the same color, or alternatively, the character strings may be painted with the respective colors whose brightness are varied depending upon rankings of importance tagged to the respective text data.

A verification is made in Step S13 regarding where the value of the current counter number (n) variable (i.e., the value of the ranking of the currently selected text data) is made equal to the total number (m) of the all character strings (text data). If the counter number (n) variable does not reach the total number of the all character strings, the process flow goes to Step S14 in which the counter number (n) variable is increased by one. Once the counter number (n) variable is increased in Step S14, the process flow goes back to Step S3 to recommence the routines of Steps S3 through S12, for generating a printing image of the character string having the next lower degree of importance on an appropriate position of the page image memory 18. That is, Step S3 is arranged such that the ranking of degree of importance of the obtained text data is decreased as the values of the counter number is increased. The routines of Steps S3 through S12 are executed repeatedly until the affirmative decision is made in Step S13, so that desired printing images of the all character strings are generated or reproduced on respective appropriate position on the page image memory 18, while each of the character strings has a desired printing position and a font size which are specified by the positional data code tagged to the corresponding text data, and has a desired font size, brightness and like which are determined based on the ranking data code tagged to the corresponding text data.

After the confirmation of generation of the printing images of the all character strings is made in Step S13, the control flow goes to Step S15 in which the image data stored in the page image memory 18 are outputted to the printing device 20, thereby printing or reproducing the image data stored on the page image memory 18 on the printing plane in the form of the sheet paper so as to obtain a desired printed matter according to the present embodiment.

The printed matter printed according to the printing method of the present embodiment is capable of functioning like as a three-dimensional display medium. Described in detail, the present printed matter makes it possible to provide with the observer different information by using different character strings, provided the observer changes the distance between himself or herself and the printed matter. That is, the observer can selectively obtain with ease a plurality of information from the large number of character strings, by only changing the distance between himself or herself and the printed matter, such that the observer recognizes in the distant observation an outline of the information or major information provided by the printed matter by observing the character strings having the larger font sizes, and in the nearsighted observation details or minor information of the printed matter by observing the character strings having the smaller font sizes. In the printing apparatus of the present embodiment which is suitable for executing the above-described printing method, the printing device 20 is not particularly limited, but may preferably be a page printer of raster-control type, a large size printer, an automatic photo-composing machine, or the like.

EXAMPLE

Figure 3:
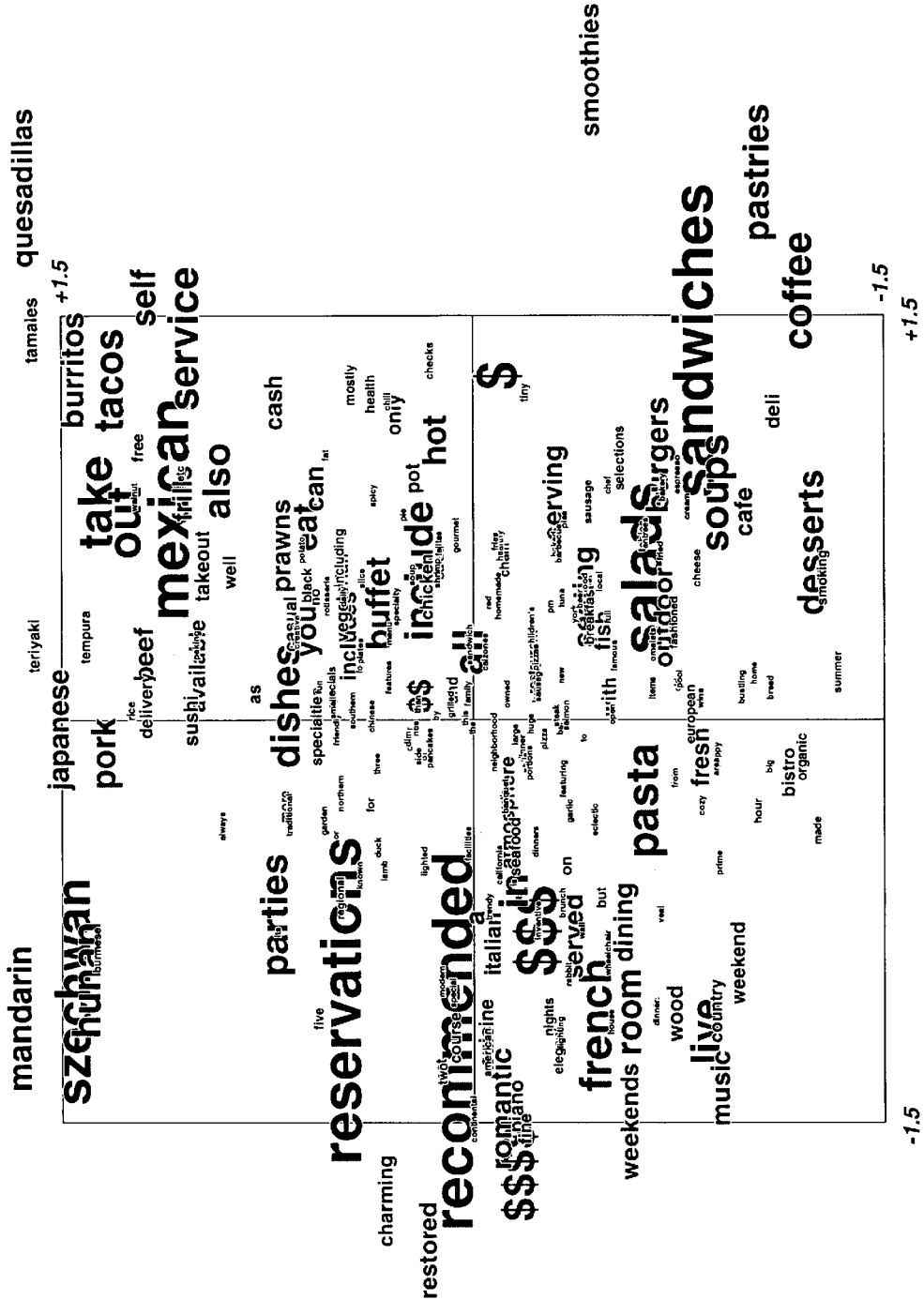
FIG. 3 is a view of a printed matter output from the printing apparatus of FIG. 1.

Referring next to FIG. 3, there is shown one example of a printed matter output from the printing apparatus which is printed according to the printing method of the present embodiment. A set of text data used for printing the printed matter of FIG. 3 is obtained as a result of a multivariate analysis performed on the multiplicity of words appeared in articles in a gourmet guidebook for introducing about 200 restaurants in the Silicon Valley, United performed on the multiplicity of words appeared in articles in a gourmet guidebook for introducing about 200 restaurants in the Silicon Valley, United State. The following Table 1 indicates a part the set of the text data.

TABLE 1

| TEXTS | X COORDINATE | Y COORDINATE | DEGREES OF IMPORTANCE |
|---|---|---|---|
| $ | 1.275 | −0.108 | 19.4 |
| a | −0.734 | −0.013 | 4.2 |
| $$ | 0.090 | 0.187 | 4.8 |
| on | −0.543 | −0.340 | 2.6 |
| sandwiches | 1.401 | −0.826 | 12.2 |
| at | 0.522 | −0.423 | 1.4 |
| bar | −0.032 | −0.318 | 1.3 |
| casual | 0.360 | 0.663 | 2.9 |
| reservations | −1.041 | 0.466 | 19.4 |
| can | 0.859 | 0.572 | 4.0 |
| salads | 0.563 | −0.635 | 10.4 |
| eat | 0.716 | 0.602 | 5.0 |
| hot | 1.035 | 0.129 | 5.0 |
| for | −0.315 | 0.373 | 1.9 |
| its | −0.785 | 0.715 | 1.6 |
| $$$ | −0.783 | −0.245 | 13.7 |
| mexican | 0.783 | 1.090 | 9.0 |
| pie | 0.761 | 0.253 | 1.2 |
| big | −0.175 | −1.084 | 1.1 |
| beef | 0.246 | 1.192 | 4.1 |
| well | 0.549 | 0.884 | 2.7 |
| more | −0.321 | 0.686 | 2.0 |
| pork | −0.124 | 1.337 | 5.0 |
| chef | 0.869 | −0.493 | 1.0 |
| wall | −0.781 | −0.395 | 0.7 |
| rice | 0.035 | 1.244 | 1.8 |
| huge | −0.015 | −0.211 | 0.1 |
| fish | 0.334 | −0.478 | 3.6 |
| live | −1.159 | −0.857 | 6.0 |
| room | −1.086 | −0.575 | 5.5 |
| wine | 0.080 | −0.832 | 1.4 |
| $$$$ | −1.682 | −0.177 | 6.5 |
| lamb | −0.559 | 0.325 | 0.6 |
| home | 0.174 | −1.028 | 1.2 |
| made | −0.412 | −1.260 | 1.8 |
| wood | −1.094 | −0.741 | 3.5 |
| soup | 0.539 | 0.221 | 1.3 |

As is apparent from the above-indicated table 1, each text data includes positional data code in the form of values of x- and y-coordinate axes and a ranking data code in the form of a degree of importance. The techniques of obtaining this type of text data is generally concerned with mathematical statistics, and is not relates to principle of the present invention. While the detailed description of the technique for obtaining the presently employed text data is omitted, for the above reasons, it should be noted that the obtained text data, in other words, the printed representation of the employed text data shows a so-called "consumer recognition space" and is considered as a representation of an implicit recognition structure based on which American peoples recognize all kinds of restaurant. The higher degree of re cognition in the consumer recognition space the character string has, the higher degree of importance the character string has, whereby the character string having a higher degree of importance is printed with a larger font in the graph of FIG. 3 as the printed matter. The x- and y-coordinate axes, that is, the vertical and horizontal axes of the graph of FIG. 3 do not have a priori or predetermined meanings, respectively, but may have respective meanings as abstract and conceptual axes, which cannot be expressed by a single word.

There will be described the outcome of observation of the printed matter of FIG. 3. When the observer observes the printed matter with a sufficiently large distance interposed between the observer and the printing plane of the printed matter, the observer can recognize with ease the outline of the consumer recognition space. Described more specifically, the distant observation reveals that x-axis relates to at its right hand side economical and simple meals and at its left hand side expensive and real meals for which reservations a re "recommended", while y-axis relates to at its lower side western-style and American-style meals and at its upper side ethnic-style meals. Accordingly, western light meals such as "sandwiches" and "salads" may appears on a right-hand lower-side portions of the printed matter, while ethnic light meals such as "Mexican" may appear on the right-hand upper-side portion of the printed matter. The "Mexican" food is likely to be recognized as "take", "out" or "takeout" food. On the left-hand lower side portion of the printed matter, there is appeared "French" which are recognized as a real western meal. Other character strings printed near the character string "French" indicates that atmosphere creation by means of "music" and interior decorations (e.g., "piano" and "romantic") are important factors for the real and the expensive restaurant. On the left-hand upper side portion of the printed matter, there are appeared Chinese foods (e.g., "Mandarin" and "Szechwan") which are recognized as more expensive foods than "Japanese" foods. In addition, the character string "parties" is appeared also on the left-hand upper side portion of the printed matter, revealing the U.S. consumer's recognition that the Chinese foods are suitable for "parties", namely are suitable to be served for many people. It is also noted that the "parties" need in general "reservation". This means that the x-axis functions to distinguish a group of restaurants such as the French and Chinese restaurants where reservations are needed, that is the consumers have a previous intention to go to these restaurant, from a group of cafes as represented by "sandwich" and "deli" where no reservation is needed, that is the consumers choose these cafes when the necessity arises.

Figure 4:
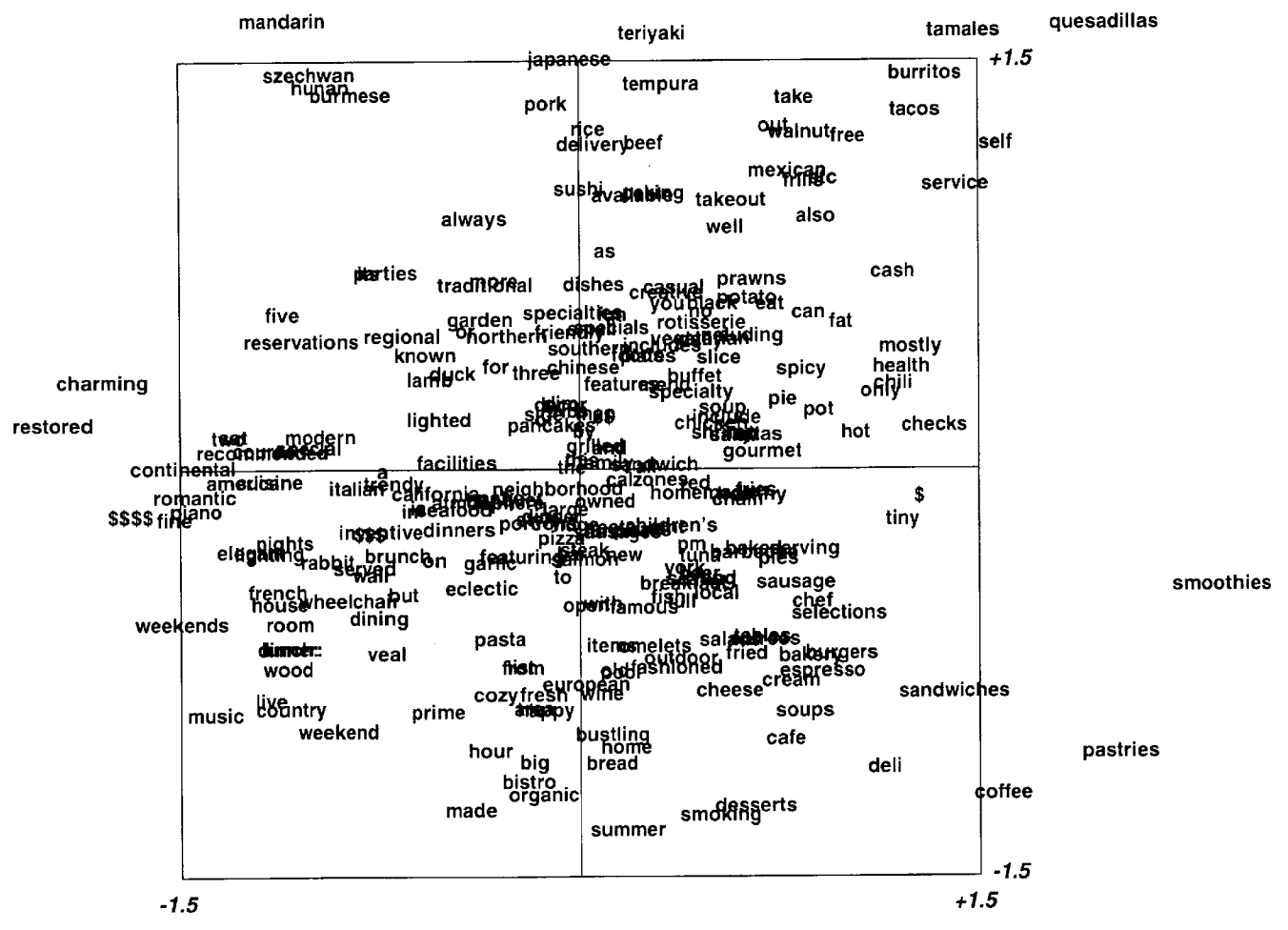

Referring next in FIG. 4, there is shown a printed matter as a comparative example wherein the same text data (character strings) are printed according to the conventionally employed printing method. In the printed matter of FIG. 4, the character strings which are superposed on another or other character strings are made illegible, although the printed matter of FIG. 4 as the comparative example is same in the number of character strings and the printing position of the character strings as the printed matter of FIG. 3 of the present embodiment. With a glance at the printed matters of FIGS. 3 and 4, it is clear that the printed matter of FIG. 4 requires the observer extremely cumbersome and time consuming works for obtaining the same information as indicated above which can be easily obtained from the printed matter of FIG. 3 printed according to the present embodiment. In the printed matter of FIG. 4, particularly, the font size of the character strings have no significance and variation, and no special treatment is provided to portions in which the character strings are mutually superposed. Accordingly, the conventional printed matter of FIG. 4 is incapable of providing not only the outline of the information i.e., the consumer recognition space with the distant observation, but also the details of the information with the close observation.

That is, the printed matter of FIG. 3 according to the present invention permits the observer to select unconsciously and easily desired information from the printed matter of FIG. 3, by only changing the distance between the observer and the printed matter. On the other hand, the printed matter of FIG. 4 as the comparative example shows the all character strings at the same level, so that the observer recognize the all character strings at the same time when the observer glances at the printed matter of FIG. 4. Therefore, the observer requires to select consciously the desired information from the printed matter of FIG. 4, resulting in an extremely cumbersome and time consuming work for selecting or arranging the information of the printed matter. As is apparent from the comparison between the present printed matter of FIG. 3 and the comparative printed matter of FIG. 4, the printed matter according to the present invention enjoy outstanding technical significance or advantages.

While the present invention has been described in detail above in its preferred embodiment, it is to be understood that the present invention is not limited to the details of the illustrated embodiment, but may be otherwise embodied.

For instance, the present invention is applied for displaying or representing a result of mathematical analysis performed for analyzing natural sentences contained in books or the like, in the illustrated embodiment, the principle of the present invention may be applicable to other printed matters representing various kinds of analyzing results, or alternatively printed matters regarding other than the analyzing results, such as pamphlets, operation manuals or advertisements.

In the illustrated embodiment, each character string is provided in the form of words such as shop names and dish names. It may be possible that the character string is provided in the form of a long sentence.

In the illustrated embodiment, the analyzing result is printed on a sheet of A4 sized paper with a white-and-black colors due to requirements of drawings of the patent application. The printed matter of the present invention may be provided with a variety of different sized papers larger or smaller than the A4 sized paper, or alternatively may be provided with multicolor printings.

In addition, the printing plane is not limited to a flat plane of a sheet of paper, but may be a curved or three-dimensional printing plane made of various kinds of materials.

In the illustrated embodiment, the maximum and minimum font sizes: F-max, F-min are manually set or inputted into the control program via the external input device. The present invention may be otherwise embodied such that the maximum and minimum font sizes: F-max, F-min are automatically determined based on a predetermined relationship between the maximum and minimum font sizes: F-max, F-min and the printing area of the printing plane. For instance, the maximum and minimum font sizes: F-max, F-min are automatically determined as functional values based on the size of the printing plane, or alternatively determined according to a predetermined data table regarding the font sizes and the printing area of the printing plane. It may be possible that suitable font sizes to be assigned to the all character strings, respectively, are automatically calculated within a range between the maximum and minimum font sizes F-max, F-min, based on the rank-able information tagged to the respective text data corresponding to the all character strings.

While the character strings is fringed with the color similar to the ground color of the printing plane, in the illustrated embodiment, the color of the fringe is not limited to the ground color of the printing plane, but may be different from the ground color of the printing plane. In this case, the character strings which are not superposed on any one of the character string(s) may be provided with the visible fringe.

Figure 5:
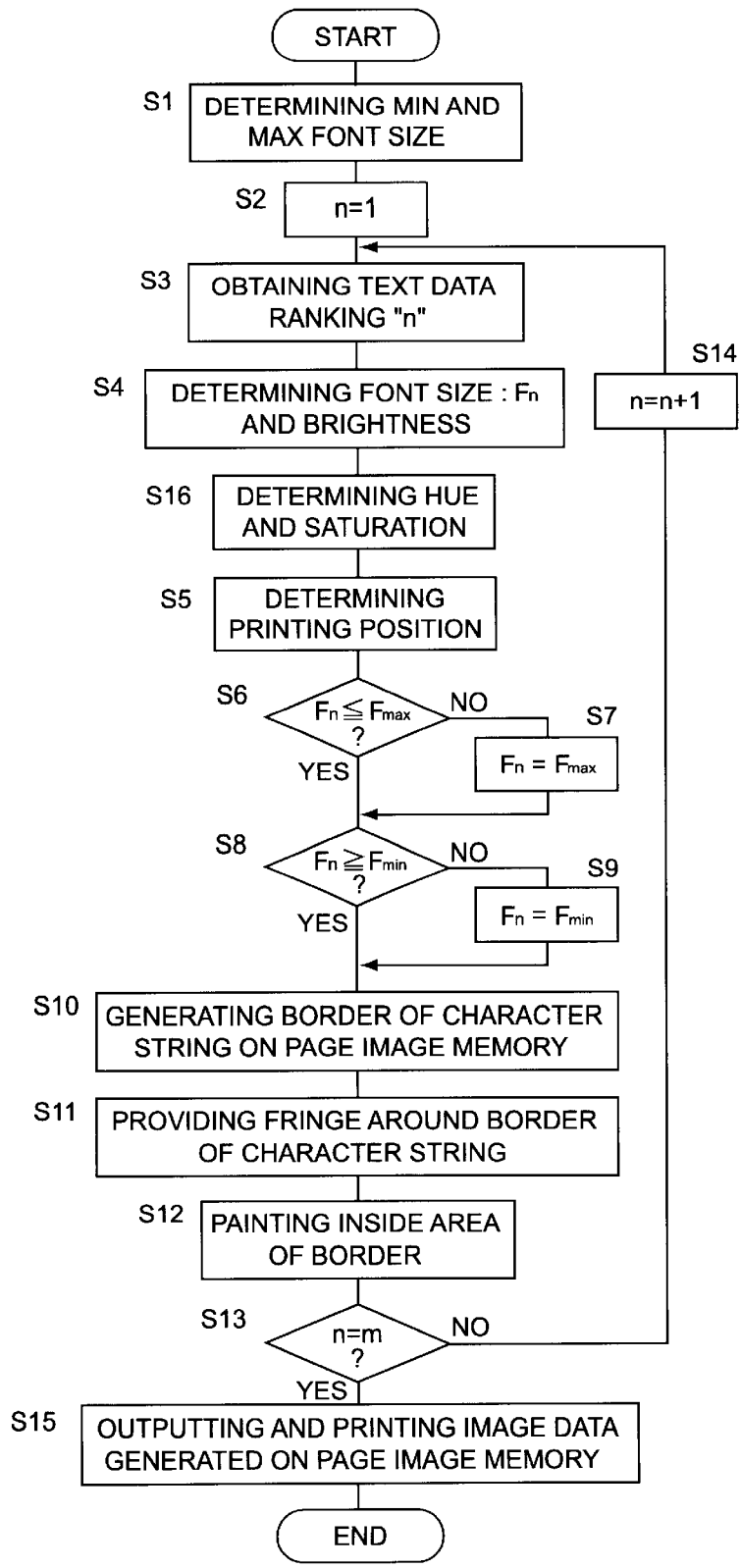
FIG. 5 is another example of a flow chart representing a control program according to which the printed apparatus of FIG. 1 is controlled.

Further, the process routines employed in the illustrated embodiment may be otherwise modified. Referring next to FIG. 5, the process routine of FIG. 2 may further include Step S16 between Steps S3 through S5, e.g., between Steps S4 and S5 as in the illustrated case, in which the CPU 10 is operated to determine hue and saturation of the currently selected character string to be printed, based on another ranking data code or categorical data code tagged to the corresponding text data. The another ranking data tagged to the text data may be arranged on the basis of another standard different from the standard used in the aforementioned embodiment. In this case, the character strings have respective hues and saturation which vary gradually in order of ranking determined on the basis of another standard. On the other hand, the categorical data tagged to the text data is utilized to categorize the text data. In this case, the character strings have respective hues and saturation which changes depending on categories thereof. For instance, the character strings categorized as Japanese meals are arranged to be printed by red color, and the character strings categorized as French meals are arranged to be printed by blue color. These arrangements permit that the resultant printing matter has multidimensional information.

Figure 6:
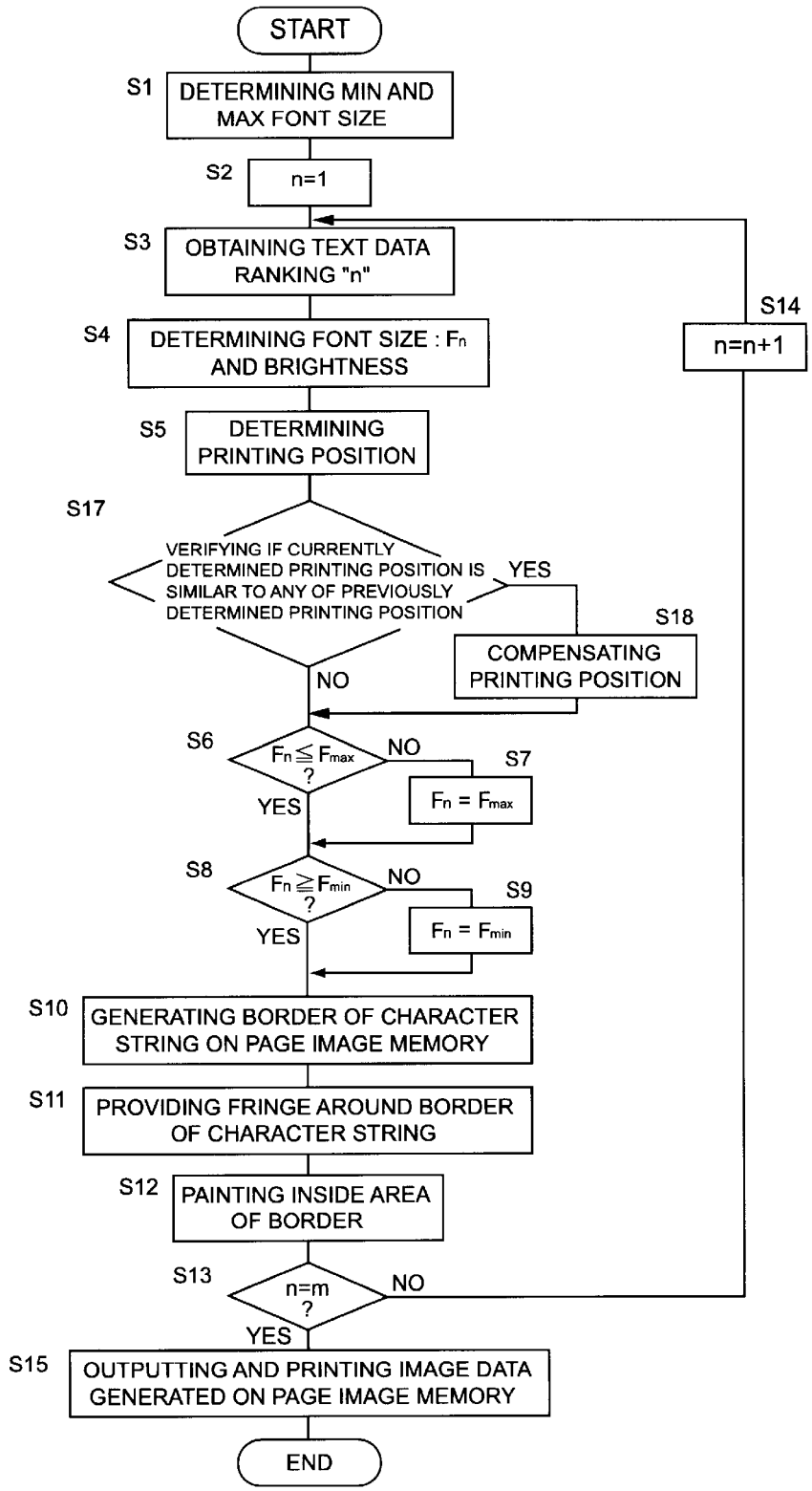
FIG. 6 is a yet another example of a flow chart representing a control program according to which the printed apparatus of FIG. 1 is controlled.

Referring next to FIG. 6, there is yet another arrangement of the process routine employed in the illustrated embodiment. That is, the process routine of FIG. 2 further includes Step S17 between Steps S5 and S6, in which a verification is made regarding whether the printing position determined in Step S is located in a range similar to that of the printing positions of the other text data which were previously determined. If a negative decision is obtained in Step S17, that is the currently obtained printing position of the character string is not located in the range similar to that of any other printing positions predetermined. On the other hand, if a positive decision is obtained in Step S17, that is the currently obtained printing position of the character strings are coincide with the printing position of any one of the previously obtained character strings, the control flow goes to Steps S18 in which the CPU is operated to compensate the printing positions of the character strings which are located in an identical printing range such that the text data which are located in the identical position (e.g., the text data whose value of the counter number variable is larger than that of the other text data) is displaced with respect to the other text data so that the printing position of the text data is deviate from that of the other printing position. Then the process flow goes to Step S6. In this respect, the identical printing range may be previously determined to a fixed value, or alternative to a value calculated by a predetermined formula on the basis of the font size of the character strings.

Referring next to FIG. 7, the process routine of FIG. 2 further includes Step S19 between Steps S12 and S13, in which a verification is made regarding whether a total value of a area where the character strings mutually superposed is within a predetermined tolerable value. If a positive decision YES is obtained in Step S19, that is the total value of the area is within the tolerable value, the process flow goes to Step S13. On the other hand, if a negative decision "NO" is obtained in Step S19, that is the total value of the area exceeds the tolerable value, the process flow goes to Step S15 so as to immediately output and print the image data generated in the page image memory, and terminate the process flow for executing the printing method of the present invention. In the presence of Step S19, the resultant printed matter is effectively prevented from drawbacks such as an undesirable increase of illegibility of the printed character strings due to undesirable increase of the area where the character strings are superposed on each other.

It is to be understood that the present invention may be embodied with various other changes, modifications and improvements, which may occur to those skilled in the art, without departing from the spirit and scope of the present invention defined in the following claims:

What is claimed is:

1. A method of printing a multiplicity of character strings on one printing plane, based on a multiplicity of text data each being tagged with at least printing positional information and rank-able information, said method comprising the steps of:

determining a font size of each of said character strings such that said font sizes of said character strings vary gradually in order of ranking of said character strings determined based on said rank-able information tagged to said text data;

arranging said character strings at respective positions of said printing plane based on said printing positional information tagged to respective text data; and if at least two of said character strings are superposed on each other, then providing a fringe around a superposed portion of one of said two character strings whose font size is smaller than that of the other character string.

2. A method of printing according to claim 1, wherein said rank-able information includes a degree of importance of each of said text data, so that said text data being ranked based on said degrees of importance thereof, and said font size of said character strings vary gradually in order of said ranking of said text data such that said font sizes are made larger as said degrees of importance are increased.

3. A method of printing according to claim 1, said method further comprising the step of:

determining a degree of brightness of each of said character strings based on said rank-able information tagged to said text data, such that said degrees of brightness of said character strings are made lager as the font sizes of said character strings are made larger.

4. A method of printing according to claim 1, said method further comprising the step of:

determining a hue and/or saturation of each of said character strings based on said rank-able information tagged to said text data.

5. A method of printing according to claim 4, wherein said rank-able information includes another rank-able information other than said degree of importance of each of said text data, so that said text data being ranked based on said another rank-able information thereof, and said hues and/or saturation of said character strings vary gradually in order of another ranking of said text data other than said ranking of said text based on said degrees of importance of said text data.

6. A method of printing according to claim 4, wherein said rank-able information includes categorical information other than said degree of importance of each of said text data, so that said text data being categorized based on said categorical information thereof, and said hues and/or saturation of said character strings vary depending on categories of said text data.

7. A method of printing according to claim 1, further comprising the step of:
   if a plurality of said character strings based on a plurality of said text data are located in an identical range, then adjusting said printing positions of said plurality of character strings such that said printing positions are offset relative to each other.

8. A method of printing according to claim 1, wherein a maximum value of said font sizes of said character strings is determined based on at least a size of a printing area of said printing plane.

9. A method of printing according to claim 8, wherein said maximum value of said font sizes of said character strings is automatically determined based on a predetermined relationship between said maximum value of said font sizes and said size of said printing area of said printing plane.

10. A method of printing according to claim 1, wherein a minimum value of said font sizes of character strings is determined based on at least a visual recognizing ability of an observer.

11. A method of printing according to claim 10, wherein said minimum value of said font sizes of said character strings is automatically determined based on a predetermined relationship between said minimum value of said font sizes and said size of printing area of said printing plane.

12. A method of printing according to claim 1, wherein said step of arranging said character strings at respective positions of said printing plane is executed in said order of ranking of said character strings determined based on said rank-able information, said method further comprising the step of:
   if a ratio of an area where said character strings are mutually superposed to an entire area of said printing plane exceeds a predetermined value, then prohibiting printing of said character strings which are ranked lower than the currently arranged character strings.

13. A printing apparatus for printing a multiplicity of character strings on one printing plane, based on a multiplicity of text data each being tagged with at least printing positional information and rank-able information, said apparatus comprising:
   a printing position determining means for determining a printing position of each of said character strings based on said printing positional information tagged to said corresponding text data;
   a ranking determining means for determining a ranking of said text data based on said rank-able information tagged to said respective text data;
   a font size determining means for determining a font size of each of said character strings such that said font sizes are arranged so as to increase or decrease gradually in order of said ranking of said text data;
   a fringe information assigning means for assigning a fringe information, if at least two of said character strings are superposed on each other, to said text data of one of said character strings whose font size is smaller than that of the other character strings, so that said character string having smaller font size are provided with a fringe around a superposed portion thereof;
   a printing device for printing on said printing plane said character strings corresponding to said plurality of text data, such that said character strings are printed on respective printing positions determined based on said printing positional information, with respective font sizes determined by said font size determining means, while being provided with said fringe based on said fringe information assigned by said fringe information assigning means.

14. A computer program product for printing a multiplicity of character strings on one printing plane based on a multiplicity of text data each being tagged with at least printing positional information and rank-able information, said computer program comprising:
   computer code that determine a font size of each of said character strings based on said rank-able information tagged to the corresponding text data, such that said font sizes are changed gradually in order of ranking of said character strings determined based on said rank-able information tagged to said text data;
   computer code that arranges said character strings at respective positions on said printing plane based on said printing positional information tagged to respective text data;
   computer code that if at least two of said character strings are superposed on each other, then providing a fringe around a superposed portion of one of said two character strings whose font size is smaller that that of the other character strings; and
   a computer-readable medium that stores the program codes.

15. A computer program data signal that includes data for printing a multiplicity of character strings on one printing plane based on a multiplicity of text data that are each tagged with at least printing positional information and rank-able information, said computer program data signal is embodied in a telecommunication medium and includes instructions which, when executed by a processor, causes the processor to perform the method of printing recited in claim 1.

16. A printed matter comprising:
   a multiplicity of character strings such as words or sentences being printed on a single printing plane according to a ranking of said character strings determined based on a predetermined rule;
   said character strings being printed at respective font sizes which vary gradually in order of said ranking of said character strings; and
   at least two of said character strings being superposed on each other in which one of said two character strings whose font size is smaller than that of the other character string is provided with a fringe at a superposed portion thereof.

17. A printed matter according to claim 16, wherein said multiplicity of character strings being printed so as to spread out over said printing plane, said printing plane having domains each representing conceptual similarity of character strings located therein, and said font sizes of said character strings representing degrees of importance thereof.

* * * * *

UNITED STATES PATENT AND TRADEMARK OFFICE
CERTIFICATE OF CORRECTION

PATENT NO. : 6,816,268 B1
DATED : November 9, 2004
INVENTOR(S) : Kazuhiko Suzuki Page 1 of 1

It is certified that error appears in the above-identified patent and that said Letters Patent is hereby corrected as shown below:

<u>Title page,</u>
Item [56], References Cited, add:
-- FOREIGN PATENT DOCUMENTS
JP   A 4-260095   09/16/1992
JP   A 10-320574   12/04/1998
JP   A 4-56988   02/24/1992
JP   A 9-230785   09/05/1997
JP   A 11-38873   02/12/1999 --.

Signed and Sealed this

Thirtieth Day of May, 2006

JON W. DUDAS
*Director of the United States Patent and Trademark Office*